E. P. KLINE.
CANDY SEALING MACHINE.
APPLICATION FILED JAN. 28, 1916.

1,245,597.

Patented Nov. 6, 1917.
2 SHEETS—SHEET 1.

Inventor
Edwin P. Kline
By his Attorney
Charles G. Hensley

E. P. KLINE.
CANDY SEALING MACHINE.
APPLICATION FILED JAN. 28, 1916.
1,245,597.
Patented Nov. 6, 1917.
2 SHEETS—SHEET 2.
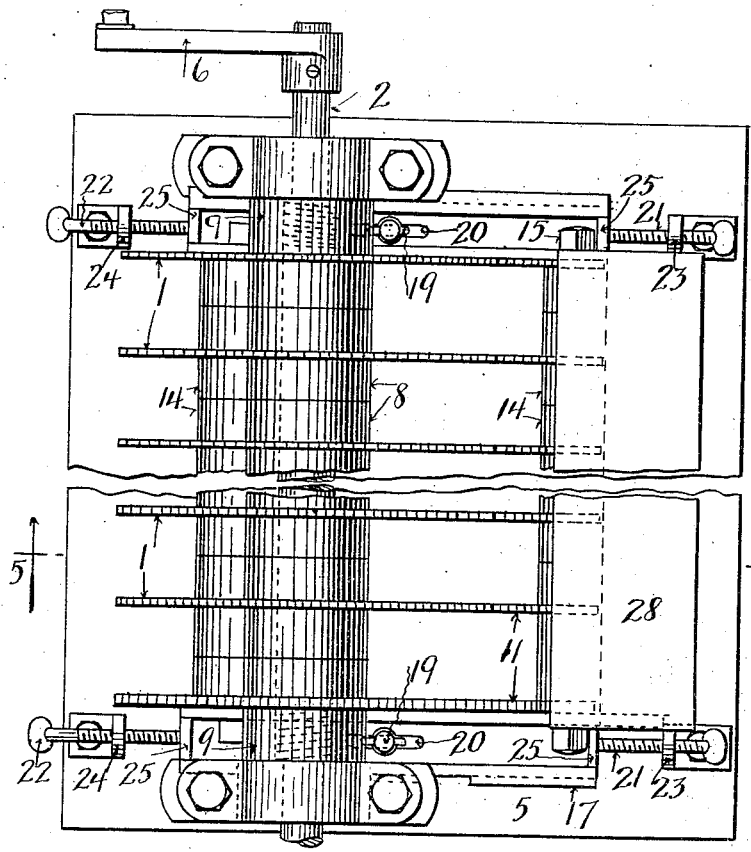
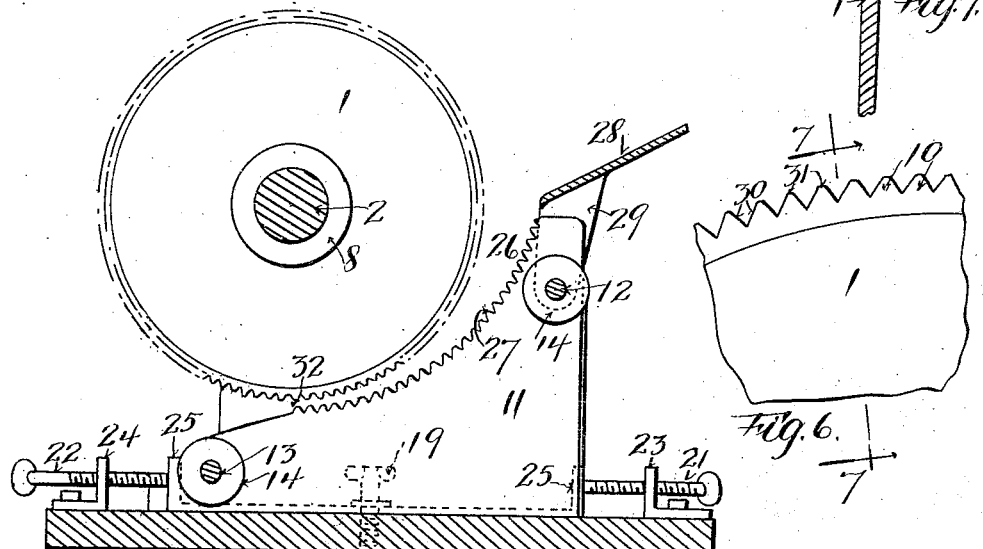
Edwin P. Kline, Inventor
By his Attorney
Charles G. Hensley

UNITED STATES PATENT OFFICE.

EDWIN P. KLINE, OF NEW YORK, N. Y.

CANDY-SEALING MACHINE.

1,245,597.      Specification of Letters Patent.      Patented Nov. 6, 1917.

Application filed January 28, 1916. Serial No. 74,758.

*To all whom it may concern:*

Be it known that I, EDWIN P. KLINE, a citizen of the United States, and a resident of the city, county, and State of New York, have invented certain new and useful Improvements in Candy-Sealing Machines, of which the following is a specification.

My invention relates to candy sealing machines, and more particularly to machines for sealing soft center candies. What are commonly known in the trade as soft center candies are those which consist of an outer coating or shell of candy which when cooled is comparatively hard; that is, it is of such nature as to preserve its shape and form in ordinary temperatures; and within the same there is a filling of different candy, flavoring or other material, which is of such consistency as to require an outer shell or coating to contain it. This filling may be substantially a liquid, or such a material as will become more or less plastic under certain climate conditions and become sticky or otherwise disagreeable to handle. These soft center candies are made in different ways, one of which is to form a batch of candy having a "soft" center and a covering of "hard" candy; and to draw the same out into a rod or stick while warmed sufficiently to make the batch plastic. After this the sticks are twisted, by hand, at various places along their length, so that the soft center is compressed and forced away from the twisted places; and the coating or covering of harder candy is so collapsed as to practically seal off sections of the filling. When the sticks have been sufficiently cooled they are easily broken off at the twisted portions by dropping or striking them lightly; leaving a number of shorter lengths having the soft centers sealed at the ends by the harder coating. The object of my invention is to provide a device for mechanically sealing the candy so that the operation may be accomplished more rapidly, thus reducing the cost of the product; and so that the product may be made more uniform with less handling.

These object are accomplished by providing relatively movable coöperating members having dull teeth which revolve or turn the candy rod and also crimp or press upon it at various positions, so as to squeeze the soft filling out of the way at such positions and collapse the harder covering, and thus close the latter at suitable distances where the rod can be broken.

In the drawings forming part of this application,

Fig. 4 is a plan view of the machine,

Fig. 5 is a sectional view, taken on the line 5—5 of Fig. 4,

Fig. 6 is an enlarged elevation of a portion of one of the revoluble blades, and Fig. 7 is a sectional view thereof, taken on the line 7—7 of Fig. 6.

Figure 1:
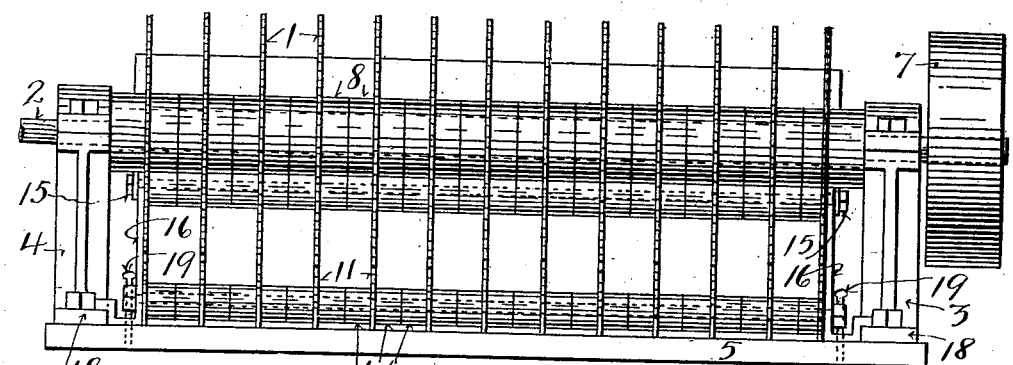
Figure 1 is an elevation of a machine embodying my invention.
Figures 2, 3:
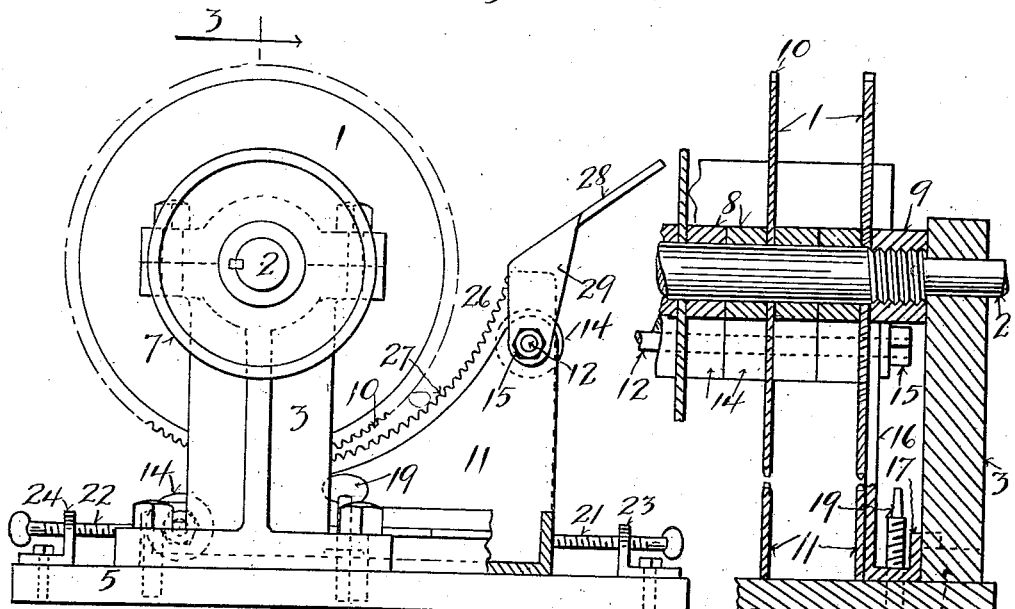
Fig. 2 is an end elevation thereof, with parts broken away.
Fig. 3 is a vertical sectional view taken on the line 3—3 of Fig. 2.

The movable sealing members are preferably circular and are preferably so mounted as to be revoluble, though it is possible to secure the desired result by oscillating them, because only a portion of a revolution is required to effect the sealing of one rod of candy.

The movable sealing members are here shown as comprising circular, flat blades, each having an aperture through the center to permit the blade to be passed over a shaft 2. The latter is journaled in standards 3, 4, arranged upon a base or bed 5; and operated either through the crank 6 by hand, or through the pulley 7 by power. The blades are spaced apart on the shaft equal or unequal distances and according to the size the final pieces of candy are to be. If for instance, the pieces of candy are to be one inch, or approximately one inch long, then the blades will be spaced approximately one inch apart. There may be any number of blades, according to the length of the rods of candy which are to be sealed. The blades are preferably spaced apart upon the shaft by means of the sleeves or collars 8 which are placed on the shaft and between adjacent blades. When the desired number of blades and spacing collars have been assembled on the shaft they are all clamped tightly together and to the shaft, by means of the nuts 9 which are threaded upon the shaft just inside the standards. When the parts are thus assembled the blades revolve with the shaft whenever the latter is operated, the shaft, collars and blades all being clamped together to move as a whole.

The blades 1 each have a number of teeth, 10 around the periphery, for acting upon the candy, and they are of a shape which will produce the desired result, as will be further pointed out.

Arranged in the same vertical planes with the several movable blades, and, therefore, spaced corresponding distances apart are coöperating members somewhat in the nature of feeding plates and these are preferably arranged to lie stationarily during the operation of the machine, although they may be adjusted, as will be pointed out. These plates 11, are preferably assembled in a somewhat similar manner to the blades 1. They are each provided with apertures at their upper and forward end, and at their lower and rearward end, so as to be capable of being placed over the rods 12 and 13. I prefer to space these feeding plates apart by means of collars 14 fitting over the rods 12, 13 and arranged between adjacent plates. If the collars 14 are of corresponding length to the collars 8 the plates 11 will be spaced the same as the blades 1, so that there will be a plate in the same vertical plane with each blade. The plates 11 and their spacing collars 14 are all clamped together by the nuts 15 which also clamp the rods 12, 13 in end of a supporting frame 16. The latter is provided with flanges 17 which engage with and are guided by the rails 18 on the bed 5, so that the frame 16 and the plates may be bodily moved forwardly and backwardly upon the rails; and they may be clamped in any position by means of the thumb screws 19 which pass through slots 20 and into the base 5; and by other screws 21, 21 which are secured in brackets 23, 24 and abut against the forward and rearward flanges 25 which are carried by the frame 16. The upper edges of the feed plates 11 are curved in such a manner that the spaces 26 between these edges and the peripheries of the blades gradually decrease from the line of entry of the candy toward the line of delivery; and for this purpose I prefer to concave the tops of the feed plates 11 on a circle somewhat larger than the circumference of blades 1; and with the curve arranged eccentric thereto. These edges of the feed plates are provided with teeth 27 similar to and preferably the same size as the teeth on the movable blades 1.

An inclined feed board 28 carried upon arms 29 bolted to the upper rod 12, by the nuts 15, is arranged to receive the candy rods thereon and to feed them upon the teeth 27, and between the plates 11 and blades 1.

When a rod of candy, comprising the harder shell and soft center, is received upon the feed board in slightly heated condition it rolls down the teeth of the concave tops of the plates 11 until it comes into contact with the teeth 10 of the blades 1; and, if the latter are not continually revolved by power, the operator revolves them by means of the crank 6. When the candy rod contacts with the teeth 10, the latter press more or less into the rod and take hold thereof; and the continued motion of the blades causes the rod to be revolved between them and the plates 11. While the rod is being revolved the teeth sink deeper and deeper into it. Since the soft center yields very readily to pressure it is very easily displaced at the line where the teeth act upon the rod, but the harder coating is simply collapsed, very much as a rubber tube is collapsed when pinched. Although the teeth indent the outer coating in order to get hold of the rod to turn it, they do not cut the rod because they are dull, or blunt, their sides 30 and top 31 having sufficient width for this purpose. From the time the rod is engaged by the teeth 10 until discharged it is continually revolved by the coöperative action of the teeth 10 and the teeth 27 and as the grooves in the rod are gradually pressed deeper and deeper the rod is fed toward the line of discharge, 32. Since the spaces between the plates 11 and blades 1 gradually decrease toward the line of discharge, the teeth continue to act upon the deepening grooves in the rod and they keep the rod turning and advancing toward the discharge position. When the rod reaches the line 32 it will be discharged upon the table upon which the machine rests. The plates 11 are so positioned in relation to the blades 1 that there is a slight space between them at the line of discharge and, therefore, the teeth 10, 27, do not cut through the rod, but only compress or seal it. This space will vary for different kinds of product, since rods having a comparatively thick outer coating will not have to be sealed to such small dimensions as those having thinner outer coatings, in order to close the rod and seal the soft centers. The rod is preferably discharged as a single piece, with the sealing grooves arranged at different places therealong. When it has cooled somewhat it may be dropped or lightly tapped and it will break into a number of separate pieces, according to the number of grooves; and each piece broken off the rod will be sealed at each end; that is, the soft center will be entirely inclosed by the sealed ends of the coating. The teeth 10 do not cut the rod as that would tend to sever the outer coating without sealing the soft center therein.

The rods may be fed down the plate 28 very rapidly, and the capacity of the machine is very great.

The product is very uniform, because each rod is sealed the same and therefore each piece broken from the rod is of uniform length.

In order to adjust the distance between the plates 11 and the blades 1, it is only necessary to loosen the screws 19 and then turn the screws 21 and 22 in opposite directions to move the frame 16 and the associated plates 11 toward or from the blades; and this will decrease or increase the intervening spaces 26.

In order to make finished pieces of different lengths it is only necessary to reassemble the blades 1 on the shaft 2 with other collars 8 of different length, between them and to similarly change the plates 11.

Having described my invention, what I claim is,

1. In a candy sealing machine, the combination of a plurality of spaced feeding plates, a plurality of revoluble, spaced blades coöperating therewith, said feeding plates and said blades having blunt, or dull teeth coöperating to revolve and impress a a candy rod received between said plates and blades, for the purpose set forth.

2. In a candy sealing machine, the combination of a plurality of spaced, stationary feeding plates, a plurality of revoluble, spaced blades, arranged in the same vertical planes as the said plates, said blades having blunt or dull teeth on their peripheries, and said plates having curved edges provided with blunt or dull teeth, said plates and blades being arranged to provide gradually decreasing spaces between the toothed edges of the plates and the toothed peripheries of the blades, the teeth on said blades and plates coöperating to revolve and impress a candy rod received between them.

3. A candy sealing machine, comprising a shaft, spacers and circular blades mounted on the shaft, said blades having blunt or broad teeth on their peripheries, a frame, a track on which said frame may slide, and means for securing said frame in different positions on said track, rods carried by said frame, spacers and vertically disposed plates mounted on said rods, said plates having curved upper edges provided with blunt or broad teeth, said blades and plates being arranged in same vertical planes, the teeth on the blades coöperating with those on the plates to revolve and impress a candy rod received between them, for the purpose set forth.

Signed at the city, county and State of New York, this 22nd day of January, 1916.

EDWIN P. KLINE.

Witnesses:
 HENRY M. WISE,
 CHARLES G. HENSLEY.

Copies of this patent may be obtained for five cents each, by addressing the "Commissioner of Patents, Washington, D. C."